Figure 1:
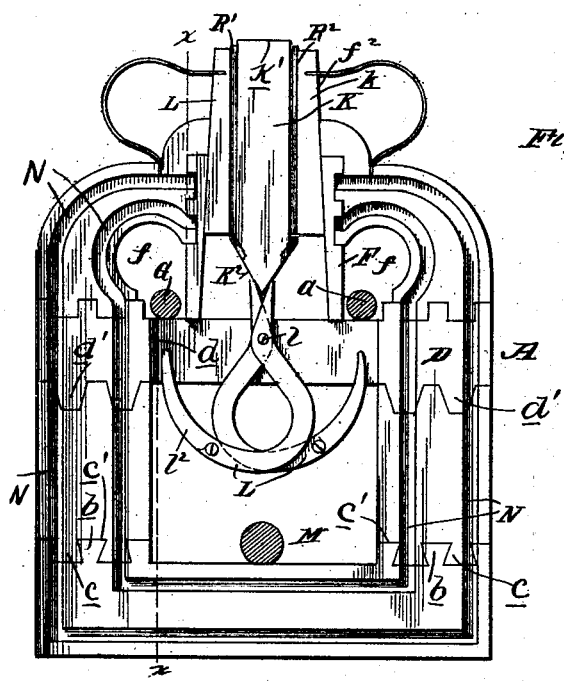

No. 696,072. Patented Mar. 25, 1902.
P. A. McGEORGE.
CONDUIT AND CONDUCTOR.
(Application filed July 13, 1901.)
(No Model.) 3 Sheets—Sheet 1.

WITNESSES: INVENTOR;
Percy A. McGeorge,
BY Milo B. Stevens & Co
Attorneys.

No. 696,072. Patented Mar. 25, 1902.
P. A. McGEORGE.
CONDUIT AND CONDUCTOR.
(Application filed July 13, 1901.)
(No Model.) 3 Sheets—Sheet 2.
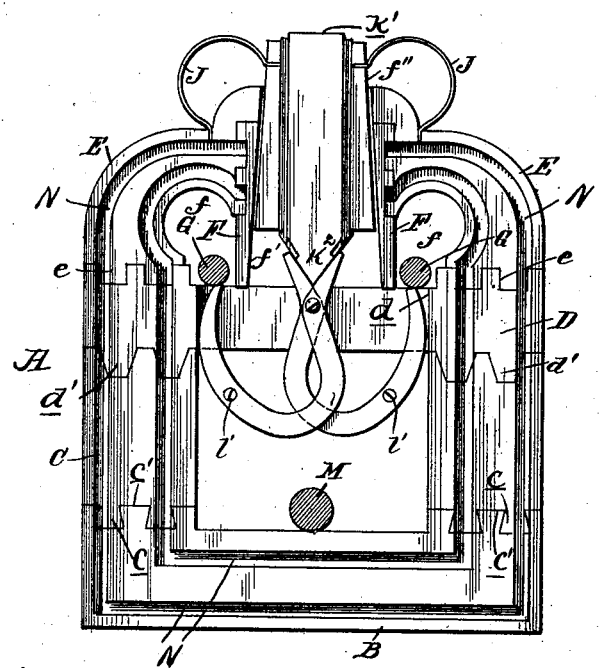
Fig. 3.
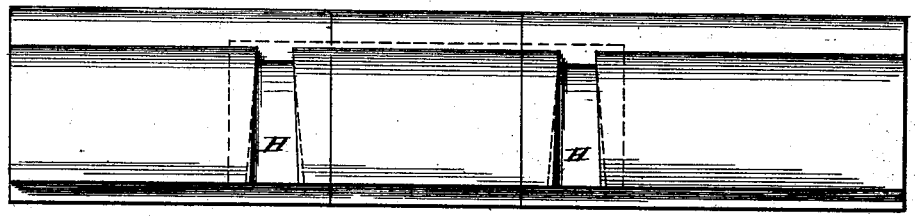
Fig. 7
Fig. 8.
WITNESSES:
INVENTOR:
Percy A. McGeorge,
BY
Attorneys No. 696,072. Patented Mar. 25, 1902.
P. A. McGEORGE.
CONDUIT AND CONDUCTOR.
(Application filed July 13, 1901.)

(No Model.) 3 Sheets—Sheet 3.

WITNESSES:
INVENTOR:
Percy A. McGeorge,
BY
Attorneys.

UNITED STATES PATENT OFFICE.

PERCY ALLAN MCGEORGE, OF NEW YORK, N. Y.

CONDUIT AND CONDUCTOR.

SPECIFICATION forming part of Letters Patent No. 696,072, dated March 25, 1902.

Application filed July 13, 1901. Serial No. 68,185. (No model.)

*To all whom it may concern:*

Be it known that I, PERCY ALLAN MC-GEORGE, a citizen of the United States, residing at New York city, in the county of New York and State of New York, have invented certain new and useful Improvements in Conduits and Conductors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved combined conduit and conductor, and has for its primary object the provision of a novel conductor so associated with a conduit that the operating parts will be completely inclosed and protected from all dust and moisture.

With the above object in view the invention contemplates the provision of a conduit constructed of a plurality of sections so joined together that the whole constitutes a practically dust and water proof casing.

The invention further embraces the idea of mounting within the conduit insulated swinging contact members adapted to be respectively thrown into and out of contact with proper feed and return wires through the medium of a compressible member operated by instrumentalities carried by the car or other vehicle.

Novel details in the construction and arrangement of the several parts will be apparent from the detailed description hereinafter when read in connection with the accompanying drawings, forming part hereof, and wherein a preferable embodiment of the invention is shown for the purposes of illustration.

When referring to the drawings, like reference characters will refer to corresponding parts in the several views.

Figure 9:
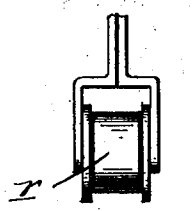
Figure 2:
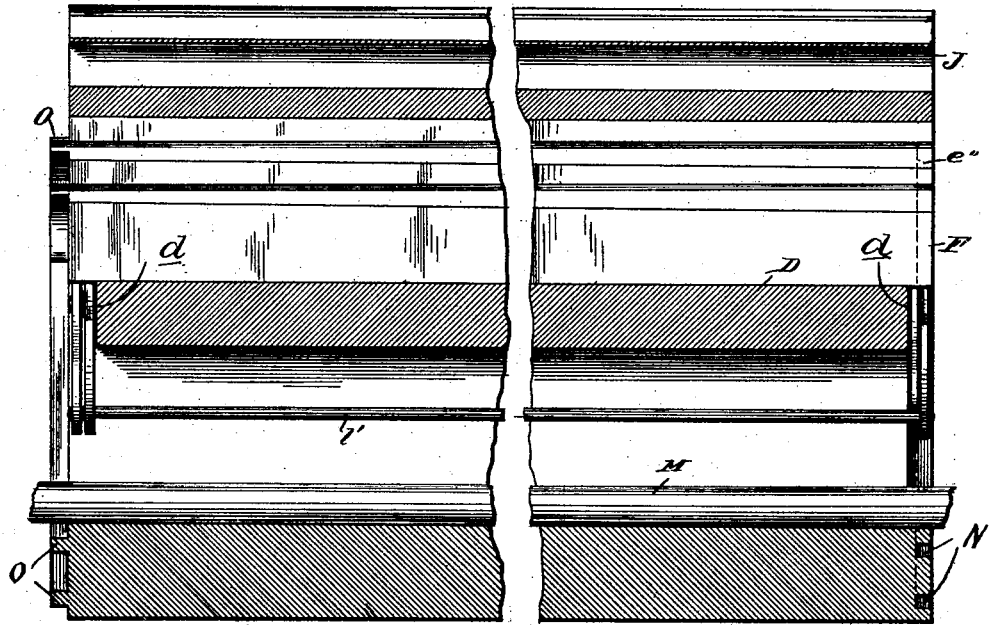
Figure 4:
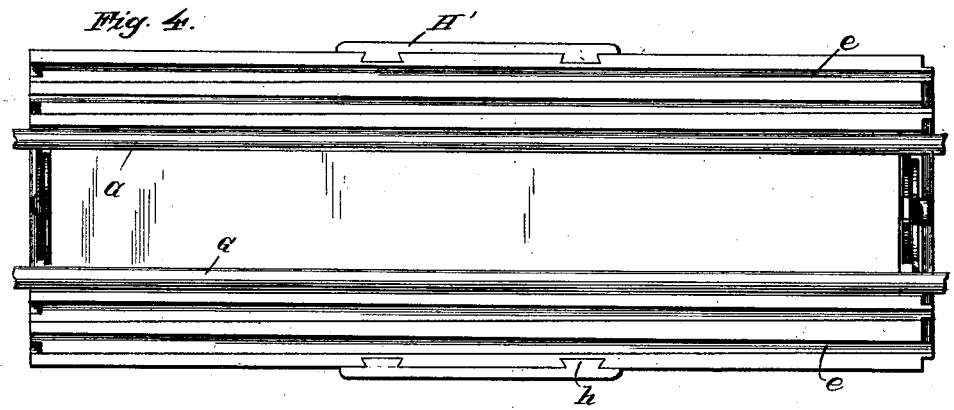
Figure 5:
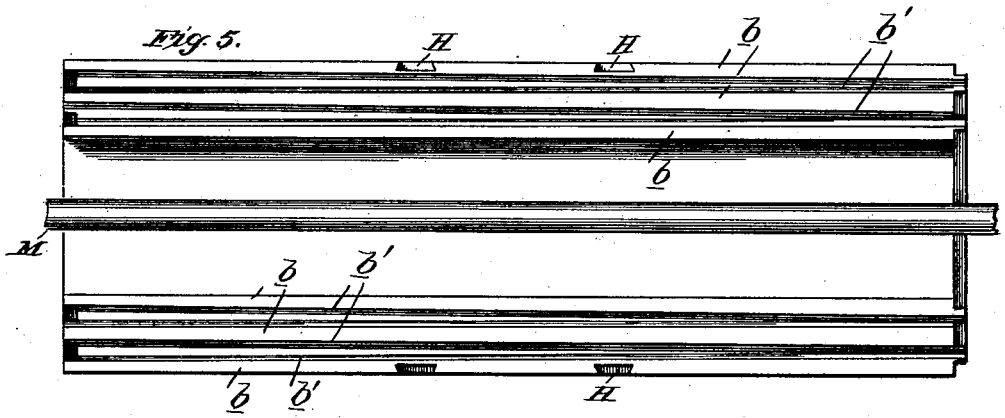
Figure 6:
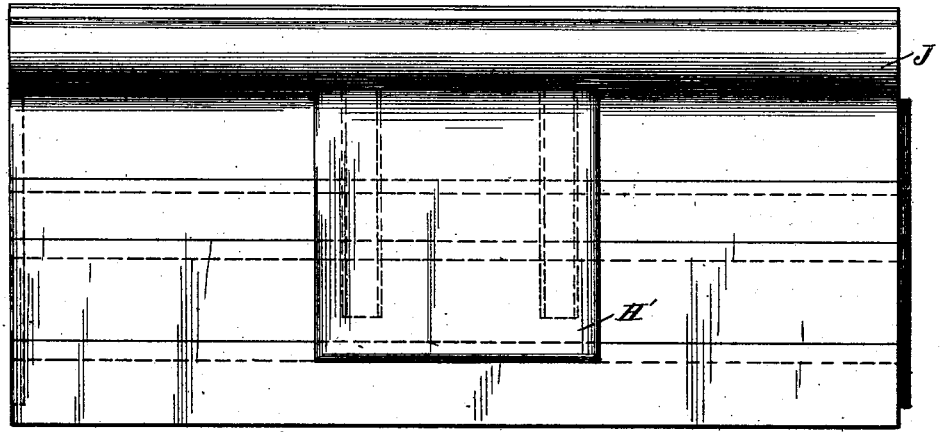

Figure 1 is an end elevation of the combined conduit and conductor. Fig. 2 is a longitudinal sectional view on the line $x\,x$ of Fig. 1, the same being broken away centrally to show the opposite ends of the complete sections. Fig. 3 is an end elevation showing the parts in a different position from that indicated in Fig. 1. Fig. 4 is a plan view of the conduit with the upper section thereof removed. Fig. 5 is a corresponding view with a part of the intermediate section removed. Fig. 6 is a side elevation of the complete section. Figs. 7 and 8 are detailed views of one side of the upper section, and Fig. 9 is a detail edge view of a trolley contact-wheel adapted to be carried by and operated from the cars.

Referring more particularly to the drawings, A designates a conduit, preferably rectangular in shape, with an arched top, as shown. This conduit is composed of a plurality of sections so formed that the conduit may be shipped from place to place with its parts separated and arranged in compact form, while, on the other hand, when the parts are properly associated, as herein pointed out, the conduit is an effective dust and water proof housing.

B designates the base of the section of the conduit, the upper opposite edges of which are formed with the ribs and grooves $b\,b'$, respectively, Fig. 5, the same being tapered either singly or doubly from end to end and adapted to engage correspondingly-shaped ribs and grooves $c\,c'$, respectively formed on the lower edge of the intermediate section C. This union of the parts is of such a character that when they are forced together a sufficient wedging takes place to lock the parts in position and form a dust and water proof connection therebetween. The union I will term a "wedge-joint," and when such term is employed with reference to other connections throughout the description of the remaining portion of the conduit it will be understood that the members of such joints are tapered from end to end in an analogous manner to accomplish the same purpose—*i. e.*, a dust and water proof connection.

Directly above the sections C is an intermediate substantially rectangular supporting-plate D, cut away at its ends, as at $d$, and provided on its lower surface with beveled projections $d'$, adapted to set in corresponding grooves on the upper edges of the sections C. The plate D on its upper surface connects with arch members E by wedge-joints $e$, Figs. 1, 3, and 4. The arch members E are formed substantially as shown in Figs. 1 and 3, with their inner edges grooved as at $e'$, Fig. 8, adapted to receive correspondingly-grooved partitions F, the grooves on the partitions being shown at e'', Fig. 2. By this construction a wedge-joint is formed between the partitions and the arch members. The partitions extend downwardly to and rest upon the upper surface of the plate D and form, together with the arch members, suitable pockets f for the wires G. It will thus be seen that the wires are so isolated that it is practically impossible for any dirt or moisture to gain access to and consequently impair the use thereof.

To afford a means for locking the various sections of the conduit from independent longitudinal movement and, further, insure a waterproof joint between the abutting ends of the respective sections, I groove the exterior surface of all the sections, as shown at H, Figs. 4, 5, 7, and 8, and provide locking or coupling plates H', Figs. 4, 6, and 8, provided with the dovetailed ribs $h$, adapted to engage the grooves in the sections. The grooves and projecting ribs are tapered throughout to form a wedge-joint of the type heretofore pointed out. One end of each section is provided with continuous grooves N, while the opposite is provided with corresponding projecting flanges O, the flanges and grooves being adapted to interlock when the sections are arranged in series.

The conduit having been described as above, I will now refer more particularly to the construction and arrangement of the conductor, attention being directed to Figs. 1, 2, 3, and 4. Running the full length of the sections and secured along one edge to the arch members E are bowed sheet-metal springs J, supporting at their opposite ends, normally in elevated position, as shown in Fig. 1, the strips $k$ of non-conducting material, secured between which is a non-conducting compression member K, having a flat upper surface $k'$ and a V-shaped lower edge $k^2$, Figs. 1 and 3. Upon the opposite sides of the compression member K, between the same and the strips $k$, are the positive and negative conductors $R'$ $R^2$, which severally and independently impinge upon and convey current to suitable insulated swinging contacts L, two at each end of the respective sections, pivoted at $l$ to the ends of the plate D. The alined pairs of these swinging contacts are insulated apart, but secured together by longitudinally-disposed connecting-rods $l'$, so that as one is operated its mate will be simultaneously operated at the opposite end of the section. As heretofore stated, the compression member is normally held in elevated position by the bowed springs J, such position being shown in Fig. 1, where the tailpieces $l^2$ of the swinging contacts are in their lowermost position. The car or other vehicle being provided with suitable operating-trolleys $r$, adapted to bear upon the compression member K, it will be apparent that upon the approach of the car onto any particular section of conduit the member K will be depressed against the tension of its supporting-springs, whereupon the V-shaped end thereof will separate the upper end of the swinging contacts L, and thereby force the tailpieces $l^2$ into contact with the wires G, one of said wires being the feed-wire and the other the return-wire. A positive current will thereupon pass from one of the wires through the swinging contacts up through one of the contacts $R'$ $R^2$ and the depressing-trolley to the motor carried by the vehicle, from whence the current will return from the car through the other of the contacts $R'$ $R^2$ and the opposite swinging contact to the other negative or return wire, as will be clear. The parts of the trolley-wheel $r$ which respectively contact with the conductors $R'$ and $R^2$ and the relative parts of the trolley stem or pole are insulated from each other, as shown in Fig. 9, so as to carry the current to and from the motor and preserve the circuit through the same. The interior surfaces of the partitions F are inclined in an upward direction, as shown at $f'$, Figs. 1 and 3, and the supporting-strips $k$ are correspondingly inclined on their exterior surfaces, as at $f^2$, same figures, so that when the section of conduit is not depressed the inclined walls of said supporting-strips and partitions will abut, as clearly illustrated in Fig. 1, and form a tight joint to prevent the admission of either solids or fluids into the slot. That portion of the conduit beneath the swinging contacts may be utilized for any purpose found most expedient—as, for instance, to receive auxiliary current-feeding cables M or the like.

From the above description it will be observed that in devising the conduit disclosed herein every possible means has been provided for confining all of the wires of the system, together with the operating devices, within a dust and water proof casing and also that in connection therewith a conductor of novel characteristics has been so associated that it operates conjointly with the conduit proper to accomplish the perfect conservation of both currents, thus eliminating the possibility of electrolytic action.

While in the accompanying drawings a particular adaptation of the invention has been delineated for the purpose of illustration, it is not the intention to be limited to such particular construction, inasmuch as various changes in the minor details and arrangement of the several parts may be made without in the least departing from the nature and spirit of the invention. For instance, the wires have been described as the feed and return wires, respectively; but it will be obvious that such wires may be both feed-wires, if desired, when employed in systems wherein the return is through the track-rails.

Having thus described the invention, what is claimed as new, and desired to be secured by Letters Patent, is—

1. In combination, a conduit having a slot, feeding means within the conduit, and a conducting-closure for the slot having wedge means adapted to cause a contact with the feeding means.

2. In combination, a conduit having a slot, feed-wires within the conduit, contact-pieces within the conduit normally out of contact with the wires, and a conducting-closure for the slot having a wedge adapted to spread the contact-pieces to contact with the wires.

3. In combination substantially as described, a conduit, oppositely-disposed wires supported in the conduit, oppositely-disposed swinging contacts, and a contact-carrying member K having inclined lower surfaces adapted to enter between the swinging contacts and spread the same as a wedge to throw the same into contact with the wires.

4. In combination substantially as described, a conduit, a wire in the conduit, contact instrumentalities working through the slot of the conduit and extending outside the same, and an elongated bowed spring secured along its edges respectively to a portion of the conduit and to the contact outside the conduit for normally supporting the contact in elevated position.

5. In combination substantially as described, a conduit, oppositely-disposed wires supported in the conduit, swinging contacts in the conduit provided with tailpieces adapted to be thrown into and out of engagement with the wires, a contact device working through the slot of the conduit adapted to engage the upper ends of the swinging contacts to operate the same, and means for normally retaining the contact device in elevated position.

6. In combination substantially as described, a conduit, oppositely-disposed wires in the conduit, swinging contacts in the conduit, and wedge means for simultaneously spreading the swinging contacts to cause the same to contact with the respective wires.

7. In combination substantially as described, a conduit, oppositely-disposed wires in the conduit, oppositely-disposed swinging contacts provided with tailpieces supported in the conduit, rods connecting the alined tailpieces at the respective ends of the swinging contacts to throw the tailpieces into engagement with the wires.

8. In combination substantially as described, a conduit comprising a body portion and an arched top, oppositely-disposed wires supported adjacent to the arches, partitions separating the wires from the spaces beneath the slot in the conduit, and contact instrumentalities working through the slot adapted to be thrown into and out of contact with the wires.

9. In combination substantially as described, a conduit comprising a body portion, an intermediate portion, oppositely-disposed wires resting on said intermediate portion, arch members extending above the wires, partitions separating the wires from the spaces beneath the slot in the conduit, and suitable contacts adapted to be thrown into and out of contact with the wires.

10. In combination substantially as described, a conduit, pockets adjacent to the respective sides of the conduit, longitudinally-disposed wires in said pockets, partitions separating said pockets from the spaces immediately below the slot in the conduit, and wedge-joints between the partitions and the adjacent edges of the conduit to which they are attached.

11. A conduit comprising a series of longitudinally-arranged sections united by wedge-joints, and locking or coupling plates uniting the sections transversely through the medium of similar wedge-joints, substantially as described.

12. A conduit comprising a series of longitudinally-disposed sections, a coupling or lock H for said sections, and wedge-joints between said coupling or lock and the respective sections, substantially as described.

13. A conduit comprising a series of detachable sections, each composed of a plurality of longitudinally-disposed parts united by wedge-joints provided at their opposite ends with continuous grooves N and projections O, substantially as and for the purpose described.

14. A conduit comprising a series of longitudinally-arranged united sections, and locking or coupling plates connecting the sections transversely, substantially as described.

In testimony whereof I affix my signature in presence of two witnesses.

PERCY ALLAN McGEORGE.

Witnesses:
HARRY E. CONWAY,
BENJAMIN G. REYNOLDS.